United States Patent
Duman (10) Patent No.: US 7,207,359 B2
(45) Date of Patent: Apr. 24, 2007

(54) APPARATUS AND METHOD FOR TRANSPORTING CONTAINERS WITHIN A PACKAGING SYSTEM

(75) Inventor: Roger A. Duman, Big Rapids, MI (US)

(73) Assignee: General Mills, Inc., Minneapolis, MN (US)

( * ) Notice: Subject to any disclaimer, the term of this patent is extended or adjusted under 35 U.S.C. 154(b) by 75 days.

(21) Appl. No.: 10/722,240

(22) Filed: Nov. 25, 2003

(65) Prior Publication Data

US 2005/0109422 A1 May 26, 2005

(51) Int. Cl.
B65B 43/42 (2006.01)

(52) U.S. Cl. .................... 141/129; 141/168; 141/174

(58) Field of Classification Search ............. 141/129, 141/165, 168, 173, 174, 177, 183, 189, 312; 53/367, 250, 251, 253, 282; 198/470.1, 803.3, 198/803.12, 803.14, 803.15, 836.1, 836.2, 198/837, 867.01, 867.02, 867.05, 867.06, 198/867.11, 867.12
See application file for complete search history.

(56) References Cited

U.S. PATENT DOCUMENTS

| | | | | |
|---|---|---|---|---|
| 2,496,792 A | * | 2/1950 | Hellberf | 220/212 |
| 3,047,032 A | * | 7/1962 | Carter | 141/99 |
| 3,169,629 A | * | 2/1965 | Randrup | 198/388 |
| 3,282,025 A | * | 11/1966 | Amberg et al. | 53/304 |
| 3,556,174 A | * | 1/1971 | Gibble et al. | 141/69 |
| 3,659,744 A | * | 5/1972 | Byrd et al. | 221/1 |
| 3,865,281 A | * | 2/1975 | Byrd et al. | 222/252 |
| 5,155,971 A | * | 10/1992 | Zopf | 53/432 |
| 5,251,423 A | * | 10/1993 | Turtschan | 53/426 |
| 5,275,033 A | * | 1/1994 | Riviere | 72/62 |
| 5,431,198 A | | 7/1995 | Turtchan et al. | |
| 5,479,759 A | | 1/1996 | Gorlich et al. | |
| 5,641,140 A | * | 6/1997 | Sorenson | 248/205.3 |
| 5,816,029 A | * | 10/1998 | Sweeny | 53/490 |
| 5,826,400 A | * | 10/1998 | Martin et al. | 53/367 |
| 5,934,042 A | * | 8/1999 | Peronek | 53/317 |
| 5,938,060 A | * | 8/1999 | Rutland, Jr. | 220/23.6 |
| 6,189,675 B1 | * | 2/2001 | Nosch | 198/394 |
| 6,251,203 B1 | | 6/2001 | Vala et al. | |

* cited by examiner

*Primary Examiner*—Khoa D. Huynh
(74) *Attorney, Agent, or Firm*—Tim Czaja; Douglas J. Taylor; Annette M. Frawley (57) ABSTRACT

A method of transporting containers from a first station to a second station within a container filling machine. Each container defines opposing first and second end sections, with the second end section forming a longitudinal recess defined by an inner surface of a sidewall. The method includes providing a carrier plate having at least one mounting piece. A container is loaded onto the mounting piece such that the second end section is positioned over the mounting piece and the mounting piece frictionally engages the interior surface of the longitudinal recess. The carrier plate is moved from the first station to the second station with the mounting piece securing the container relative to the carrier plate during movement of the carrier plate.

48 Claims, 9 Drawing Sheets

APPARATUS AND METHOD FOR TRANSPORTING CONTAINERS WITHIN A PACKAGING SYSTEM

BACKGROUND

The present invention relates to container packaging systems. More particularly, it relates to transporting of containers within a packaging system, such as a system for packaging flowable food products in containers.

One area where the use of plastic containers has become widespread is in the food packaging industry. Accordingly, it is common for these plastic food containers to serve as the end display package as presented for sale to the customer. A number of different container configurations have been devised, although a few shapes are more prevalent than others. For example, frustoconical containers (i.e., having a sidewall that tapers from a larger diameter top to a smaller diameter bottom) are commonly used for products such as cottage cheese, sour cream, applesauce, or the like. Conversely, there are also currently available thermoformed containers that have a reverse tapered sidewall (or reversed frustoconical shape) with a larger diameter bottom. This type of thermoformed plastic food containers is typically used to package yogurt (e.g., flavored yogurt) as well as other products. A multitude of other plastic food container designs are also available (such as those having a non-tapering sidewall and/or non-circular in transverse cross-section), and can contain a wide variety of other types of products, that may or may not be food products.

Regardless of the exact container configuration, packaging systems used to produce filled containers on a mass production basis generally entail two or more stations at which the containers are loaded, filled, and closed. A drive system transports the containers from station-to-station. In the context of container packaging, conventional drive systems include carrier plates that are adapted to receive and maintain a number of individual containers. A series of the so-constructed carrier plates are linked to one another and driven in a conveyor-like fashion. The mechanism by which the individual containers are maintained relative to the carrier plate will vary, depending upon the container shape and related constraints. As a general statement, however, accepted container mounting techniques are premised solely upon receiving and supporting the container at or along an exterior surface thereof.

For example, U.S. Pat. No. 5,155,971 describes a packaging apparatus in which containers are sequentially transferred from a loading station to a filling station by a drive system including a plurality of transport carriers 12. More particularly, and as shown in FIG. 2 of U.S. Pat. No. 5,155,971, each transport carrier 12 includes a plate 38 forming a series of holes 40 sized to receive a container 14. Further, a support ring 41 and a plurality of posts 42 extend upwardly from the plate 38 at each hole 40. The container 14 is received within hole 40 and the ring 41 that otherwise contacts an exterior of the container 14. The posts 42 generally center the container 14 relative to the ring 41 via contact with a lip 36 of the container 14. The ring 41 does not tightly engage the container 14, but instead simply supports the lip 36. This approach is highly viable due to the frustoconical shape of the container 14 whereby the bottom 30 of the container 14 has a smaller diameter as compared to the top/lip 36. In this manner, the container 14 slides within the hole 40 and the support ring 41 such that the lip 36 (or top) of the container 14 is fully supported by the plate 38 in an upright position. Thus, the container 14 will not readily tip relative to the plate 38.

Figure 1:
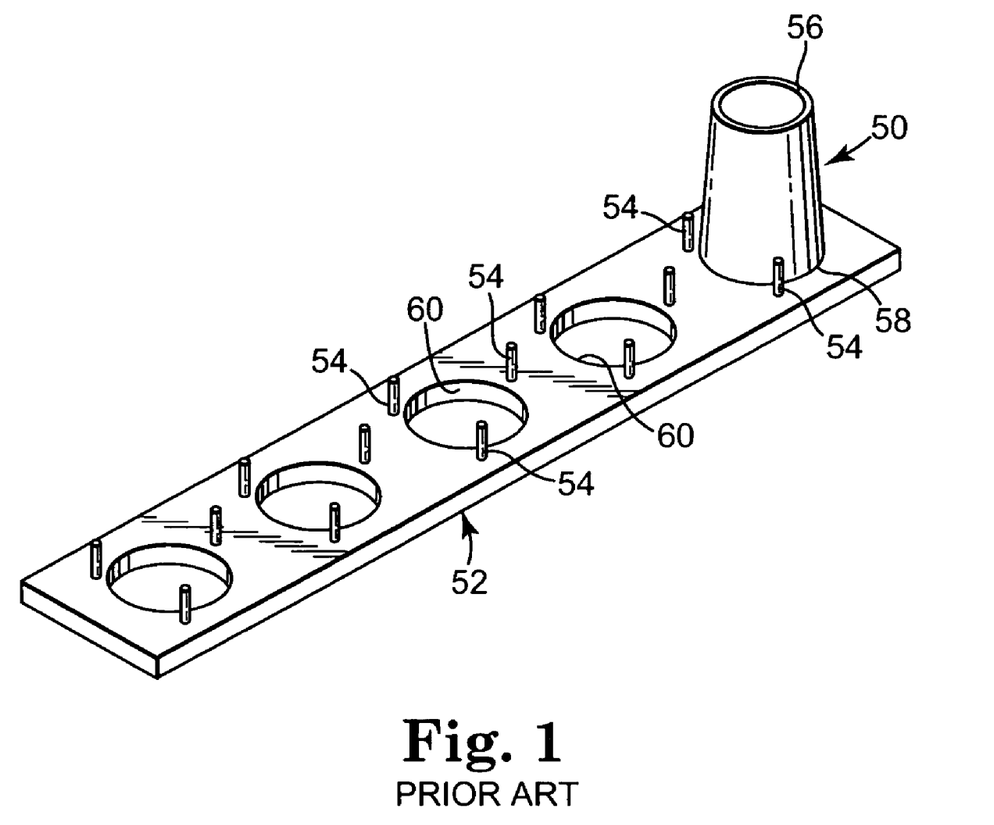
FIG. 1 is a perspective view of a prior art transport device in conjunction with a container.

While the above-described transport device configuration is well accepted, it can only be used with frustoconically-shaped containers whereby the desired, upright container orientation places the smaller diameter end below the larger diameter end. For example, and again with reference to FIG. 2 of U.S. Pat. No. 5,155,971, were the container 14 orientation to be reversed (i.e., the smaller diameter end 30 being open and oriented above a closed, larger diameter end 36), the container 14 could not be received over or within the ring 41. Similarly, a uniform diameter container (e.g., defining a right cylinder, other shapes with non-tapering sidewalls, etc.) could not be supported by the ring 41. A common technique for addressing this problem is to simply remove the ring 41, leaving only the posts 42. One example of this configuration is shown in FIG. 1 of the present application that otherwise illustrates a container 50, a carrier plate 52, and groupings of three posts 54. As a point of reference, the carrier plate 52 of FIG. 1 is adapted to maintain up to five containers, but is illustrated as supporting the one container 50. The container 50 of FIG. 1 has a reversed frustoconical shape including an open, top end 56 and a closed, bottom end 58, with the bottom end 58 having a diameter greater than a diameter of the top end 56. The container 50 is maintained relative to the carrier plate 52 by a set of the three posts 54 equidistantly spaced about a hole 60 in the carrier plate 52 (it being understood that the hole 60 associated with the container 50 is hidden in the view of FIG. 1). A diameter of the hole 60 is less than that of the container bottom end 58. That is to say, the bottom end 58 rests on the carrier plate 52, with the posts 54 preventing overt movement of the container 50 via periodic contact with the bottom end 58. Notably, due to machining tolerance requirements, a collective diameter defined by a spacing of the posts 54 is greater than a diameter of the bottom end 58, on the order of 0.25 inch. As such, the container 50 readily moves between the posts 54 (for example, upon movement of carrier plate 52), possibly leading to alignment concerns. Perhaps even more problematic is the ease with which the container 50 can tip relative to the carrier plate 52. In particular, and especially prior to filling, a center of gravity of the container 50 is at or above a height of the posts 54. Thus, with movement of the carrier plate 52 and thus movement of the container 50, the container 50 can easily tip over the posts 54, causing major delays in production. With taller containers, this tippage concern is amplified.

Packaging systems for handling, transporting, filling, and closing containers on a mass production basis are widely employed in the packaging industry. Unfortunately, for many container configurations, accepted transport devices are unworkable and/or less than optimal. As such, a need exists for an improved container transport device and method for use with product filling systems.

SUMMARY

One aspect of the present invention relates to a method of transporting containers from a first station to a second station within a container filling machine. Each container defines opposing first and second end sections, with the second end section forming a longitudinal recess defined by an interior surface of a sidewall. With this in mind, the method includes providing a carrier plate having at least one mounting piece. A container is loaded onto the mounting piece such that the second end section is positioned over the mounting piece and the mounting piece frictionally engages the interior surface of the longitudinal recess. The carrier plate is moved from the first station to the second station with the mounting piece securing the container relative to the carrier plate during movement of the carrier plate. In one preferred embodiment, a multiplicity of carrier plates, each including a multiplicity of mounting pieces, are provided, with the method further including loading and transporting a multiplicity of containers.

Another aspect of the present invention relates to a container filling system for filling containers. Each container defines opposing first and second end sections, with the second end section forming a longitudinal recess defined by an interior surface of a sidewall. With this in mind, the system includes a first, container loading station, a second, container filling station, and a transport device. The transport device transports containers from the first station to the second station and includes a carrier plate and at least one mounting piece. The carrier plate is mounted to a drive system and defines a top surface and a bottom surface. The mounting piece is assembled to the carrier plate and extends from the top surface thereof. In this regard, the mounting plate is adapted to engage the interior surface of the longitudinal recess of a container and secure the container relative to the carrier plate. Finally, the transport device is characterized by the absence of posts adjacent the mounting piece. In one embodiment, the mounting piece includes a base extending from the carrier plate and a shoulder extending from the base opposite the carrier plate. The base defines a diameter greater than that of the shoulder.

Yet another aspect of the present invention relates to a transport device for use as part of a filling system for filling containers. Each container defines opposing first and second end sections, with the second end section forming a longitudinal recess defined by an interior surface of the sidewall. With this in mind, the transport device includes a carrier plate and at least one mounting piece. The carrier plate defines a top surface and a bottom surface. The mounting piece is assembled to the carrier plate and extends from the top surface. The mounting piece is adapted to engage the interior surface of the longitudinal recess of a container and secure the container relative to the carrier plate. Finally, the transport device is characterized by the absence of posts adjacent the mounting piece. In one preferred embodiment, the mounting piece includes a base that is circular in transverse cross-section.

DETAILED DESCRIPTION

The present invention relates to a method and apparatus for handling and transporting containers within a packaging system, more particularly, a packaging system adapted to dispense product into a container. With this in mind, FIG. 2 generally illustrates an exemplary packaging system 70 with which the present invention is useful. In general terms, the packaging system 70 processes a plurality of containers 72 through various operations performed at two or more stations 74 (referenced generally in FIG. 2). To this end, the packaging system 70 includes a drive system 76 that is supported by a frame 78 relative to the stations 74. The drive system 76 includes at least one transport device 80 that, in one embodiment, is driven in a conveyor-like fashion by a drive mechanism 82. The drive mechanism 82 can assume a variety of forms, and generically links (such as by a chain and/or belt 84) the transport device(s) 80 to a motor (not shown) or other device capable of moving the linkage and thus the transport device(s) 80. Regardless, and as described in greater detail below, the transport device(s) 80 is configured to receive and rigidly maintain the container(s) 72 mounted thereto as the drive system 76 transports the container(s) 72 to the various stations 74.

Figure 2:
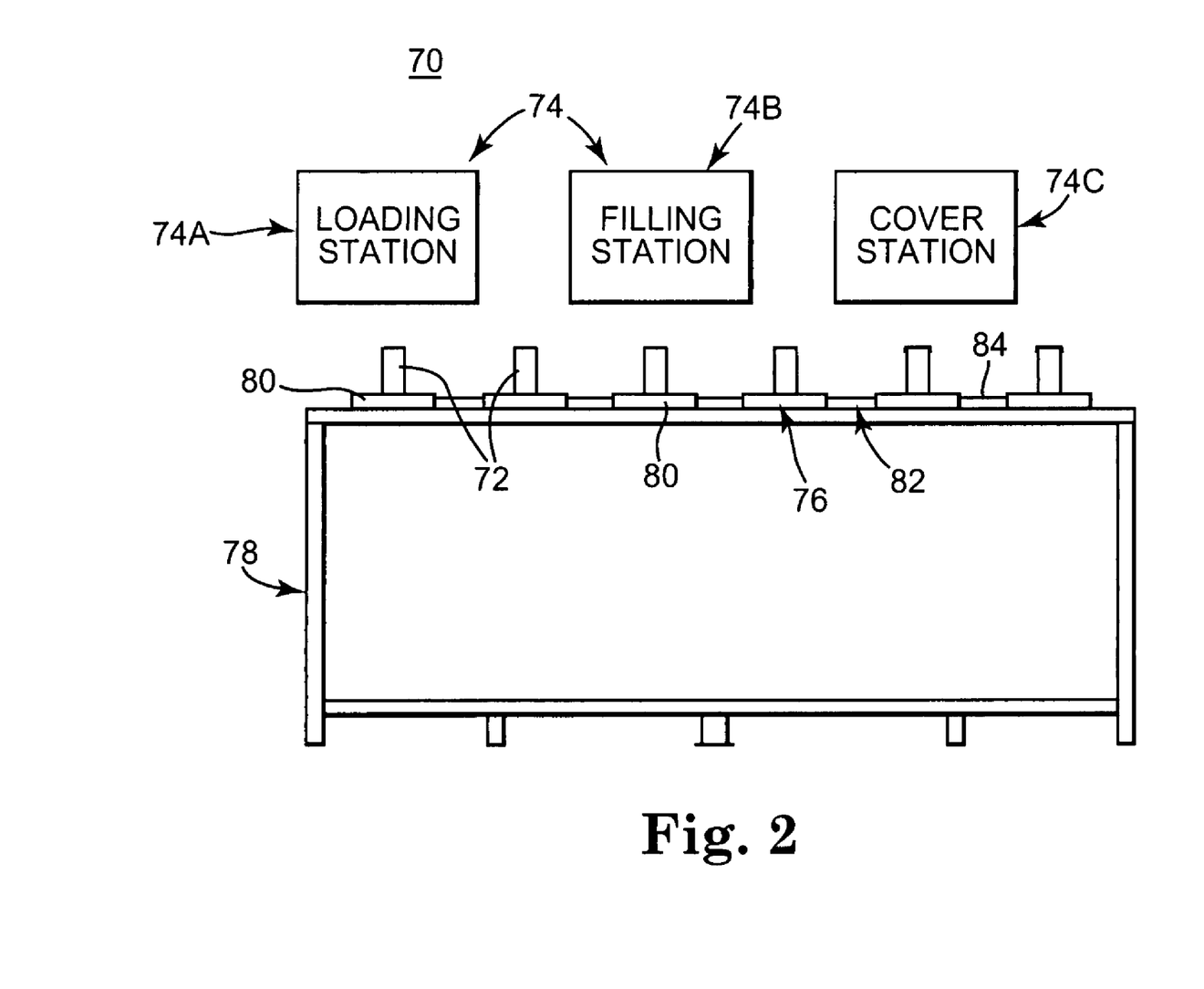
FIG. 2 is a side elevational view of a packaging system incorporating a drive system including a transport device in accordance with the present invention, with portions shown in block form.

It will be understood that the simplified illustration of FIG. 2 represents but one possible configuration of a packaging system in accordance with the present invention. Numerous other stations, handling devices, and/or processing mechanisms can be provided. For example, the stations 74 have been shown in block form, but will inherently entail complex mechanisms configured to perform the desired operation. With this in mind, and in one embodiment, the stations 74 include a first, container loading station 74A, a second, container filling station 74B, and a third, cover station 74C. In general terms, the loading station 74A is configured to locate or mount individual ones of the containers 72 onto a respective transport device 80. The filling station 74B is configured to dispense a desired product (e.g., a flowable product such as yogurt) into the containers 72. Finally, the cover station 74C is configured to apply a cover or seal to the filled containers 72. Once again, the stations 74A–74C can include a variety of mechanisms and/or associated devices not shown in FIG. 2. Further, additional station(s) 74 can be provided and/or one or more of the stations 74A–74C eliminated. One exemplary packaging system is available from Autoprod, Inc., of Clearwater, Fla., under the trade name FP 2X12 CIP filler, although a wide variety of other packaging systems are equally applicable.

Figure 3:
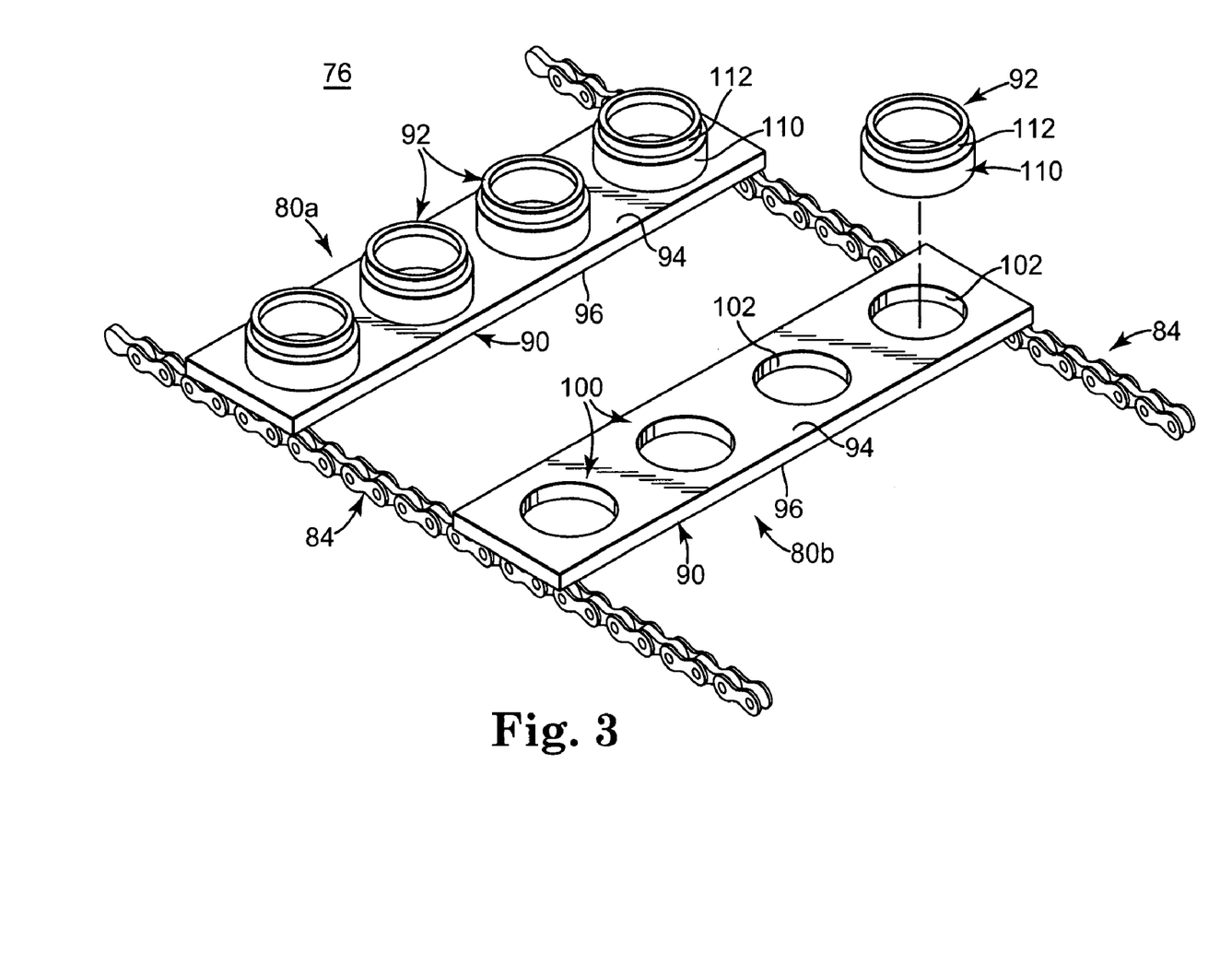
FIG. 3 is a side, perspective view of a portion of the drive system of FIG. 2, including two transport devices in accordance with the present invention.

With the above general constraints in mind, a portion of the drive system 76, including two transport devices 80 (designated as 80*a* and 80*b*) in accordance with the present invention is shown in FIG. 3. By way of reference, the drive system 76 can include any number of the transport devices 80, including a single transport device 80. Regardless, each transport device 80*a*, 80*b* includes a carrier plate 90 and at least one mounting piece 92. The carrier plates 90 are connected to the linkage 84 that otherwise causes the transport device(s) 80 to move when driven by an appropriate mechanism (not shown), such as a motor. The mounting piece(s) 92 is connected to a corresponding carrier plate 90 and, as described in greater detail below, is adapted to retain a respective one of the containers 72 (FIG. 2).

The carrier plate 90 can assume a variety of forms, but is preferably an elongated body defining opposing upper and lower surfaces 94, 96, respectively. With specific reference to the transport device 80*b* that otherwise illustrates the carrier plate 90 apart from the mounting pieces 92, the carrier plate 90 defines a plurality of receiving zones 100 (referenced generally), each characterized by an aperture 102 extending between the upper and lower surfaces 94, 96. While the carrier plate 90 of FIG. 3 is shown as providing four of the receiving zones 100, and thus four of the apertures 102, any other number is equally acceptable, and is a function of the overall length of the carrier plate 90 and a size of the containers 72 (FIG. 2).

Figure 4A:
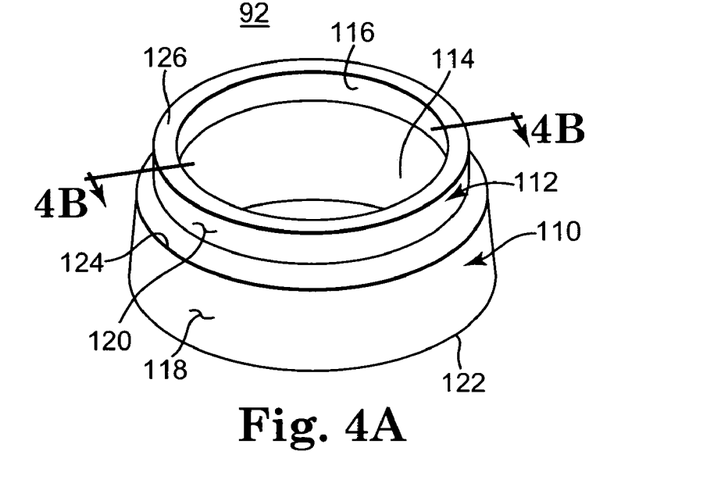
FIG. 4A is an enlarged, perspective view of a mounting piece in accordance with the present invention associated with the transport device of FIG. 3.

Respective ones of the mounting pieces 92 are connected to the carrier plate 90 at respective ones of the receiving zones 100. With specific reference to the transport device 80*a* of FIG. 3, each mounting piece 92 is positioned so as to extend from the upper surface 94 of the carrier plate 90. In one embodiment, each mounting piece 92 includes a base 110 and a shoulder 112. The base 110 extends from the upper surface 94 of the carrier plate 90, whereas the shoulder 112 extends from the base 110 opposite the carrier plate 90. The base 110 defines a maximum transverse outer dimension of the mounting piece 92, whereas the shoulder 112 defines a maximum outer dimension less than that of the base 110. To this end, exact shapes and dimensions of the base 110 and the shoulder 112 are a function of the container 72 (FIG. 2) otherwise received by the mounting piece 92. With the one embodiment of FIG. 3, the base 110 and the shoulder 112 are circular in transverse cross-section, although, as described in greater detail below, other shapes are equally acceptable. With additional reference to FIG. 4A, the base 110 and the shoulder 112 have a ring-like construction, each defining a passage 114, 116, respectively. The passages 114, 116 are co-axially aligned. Further, the base 110 defines an exterior surface 118, whereas the shoulder 112 defines an exterior surface 120. With the one embodiment of FIG. 4A, the exterior surface 118 of the base 110 generates a reversed frustoconical shape in lateral extension from a bottom side 122 to a top side 124. That is to say, an outer dimension (e.g., diameter) at the bottom side 122 is greater than an outer dimension (e.g., diameter) at the top side 124. With this but one acceptable configuration, the exterior surface 118 of the base 110 is adapted to receive a container (not shown) having a similar, reversed frustoconical shape as described below.

Figure 4B:
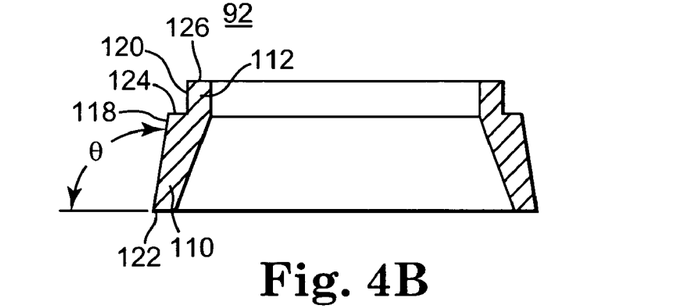
FIG. 4B is a cross-sectional view of the mounting piece of FIG. 4A.

In one embodiment, the reversed frustoconical shape of the base is characterized by the exterior surface 118 defining an angle θ of at least 91° relative to horizontal in extension from the bottom side 122 to the top side 124, more preferably in the range of 91°–105°, and even more preferably approximately 95° as best shown in FIG. 4B. For example, in one embodiment, the base 110 has a longitudinal length in the range of 0.2–0.4 inch, more preferably approximately 0.270 inch, and tapers in diameter (from the bottom side 122 to the top side 124) an amount in the range of 0.005–0.1 inch, more preferably approximately 0.048 inch. Alternatively, a wide variety of other dimensions and shapes can be employed.

The shoulder 112 extends from the top side 124 of the base 110. In one embodiment, the exterior surface 120 of the shoulder 112 defines a right cylinder in extension from the base 110 to a leading end 126. Alternatively, the shoulder 112 can define a frustoconical or reversed frustoconical shape. Regardless, a longitudinal height of the shoulder 112, as well as an overall height of the base 110/shoulder 112 (i.e., extension from the bottom side 122 of the base 110 to the leading end 126 of the shoulder 112) is preferably selected as a function of the container 72 (FIG. 2) to be received by the mounting piece 92. In one embodiment, the extension of the mounting piece 92 from the upper surface 94 of the carrier plate 90 (i.e., combined height of the base 110/shoulder 112) is in the range of 0.3–0.6 inch, more preferably approximately 0.455 inch, although other dimensions are equally acceptable. An outer dimension (e.g., diameter) of the shoulder 112 is smaller than that of the base 110 so as to not interfere with assembly of a container 72 to the base 110. In one embodiment, an outer transverse dimension (e.g., diameter) of the shoulder 112 is in the range of 0.1–0.4 inch, more preferably approximately 0.257 inch, less than that of the base 110, although other dimensions are equally acceptable. Even further, the mounting piece 92 can be constructed so as to not include a discernable shoulder. For example, the base 110 can be constructed to have a continuous height approximating a height of the combined base 110/shoulder 112 of FIGS. 4A and 4B. Alternatively, the shoulder 112 of FIGS. 4A and 4B can simply be eliminated.

Figure 4C:
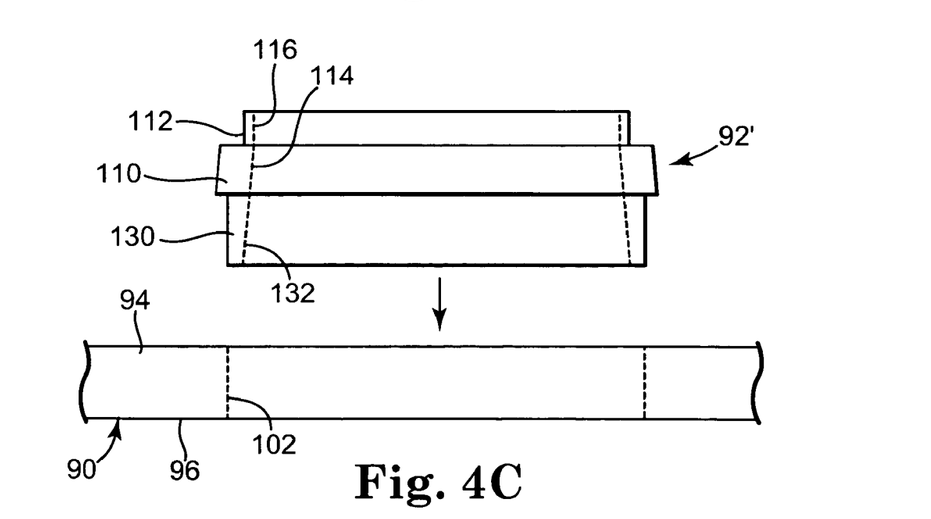
FIG. 4C is an exploded view of a portion of a transport device assembly including an alternative embodiment mounting piece in accordance with the present invention in conjunction with a carrier plate.

The mounting piece 92 can be comprised of a wide variety of rigid materials, such as metal or plastic. The base 110 and the shoulder 112 are integrally formed in one embodiment, but can instead be separately formed and subsequently assembled. Further, and in one embodiment, the base 110 is directly secured to the upper surface 94 of the carrier plate 90 (such as by a weld or other known technique) as shown in FIG. 3. Alternatively, and with specific reference to FIG. 4C, in an alternative embodiment, the mounting piece 92' further includes a foot 130 extending from the base 110 opposite the shoulder 112. The foot 130 is adapted to be received by, and frictionally retained within, the aperture 102 of the carrier plate 90 and thus, in one preferred embodiment, is circular in transverse cross-section, defining an outer diameter less than that of the base 110. Once again, a wide variety of other shapes are equally acceptable, selected as a function of the shape of the aperture 102. As a point of reference, current carrier plate configurations include the circular aperture 102 in combination with posts extending from the upper surface 94 (for example, the posts 54 of the prior art transport device 50 of FIG. 1). With this in mind, and in one preferred embodiment, the prior art carrier plate 52 (FIG. 1) serves as the carrier plate 90 of the present invention, with the posts 54 (FIG. 1) being removed and the mounting piece 92, and in particular the foot 130, being captured within the aperture 102 upon final assembly, as shown in FIG. 4C. With this construction, the foot 130 forms a passage 132 that is otherwise co-axially aligned with the passages 114, 116 of the base 110 and the shoulder 112, respectively. Once again, however, a wide variety of other constructions are equally acceptable for securing the mounting piece 92' or 92 (FIG. 4A) to the carrier plate 90, such that the foot 130 can be eliminated. Upon final assembly of the selected mounting piece construction, however, the base 110, and where provided the shoulder 112, extend from the upper surface 94 of the carrier plate 90.

Figure 5A:
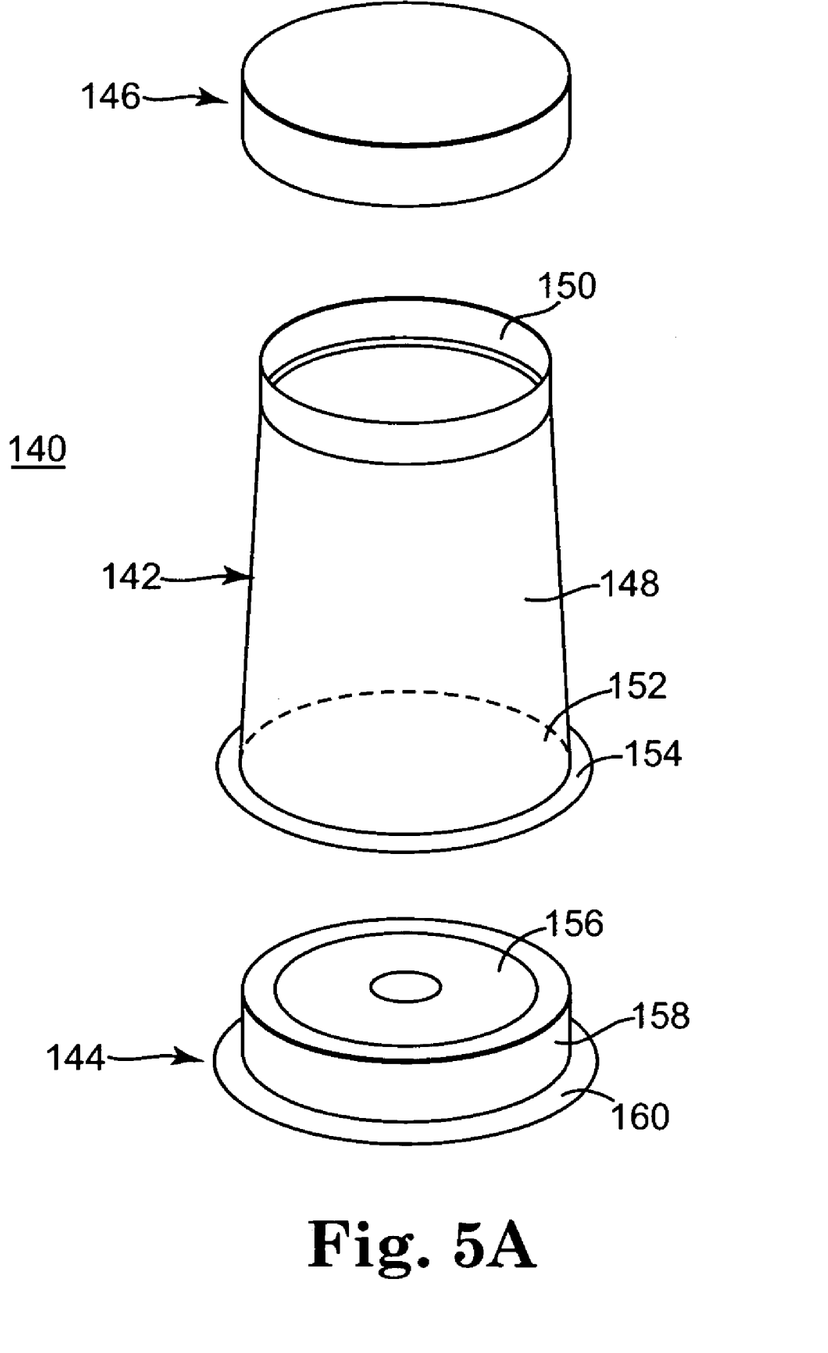
FIG. 5A is an exploded, perspective view of an exemplary container useful with the system and method of the present invention.
Figure 5B:
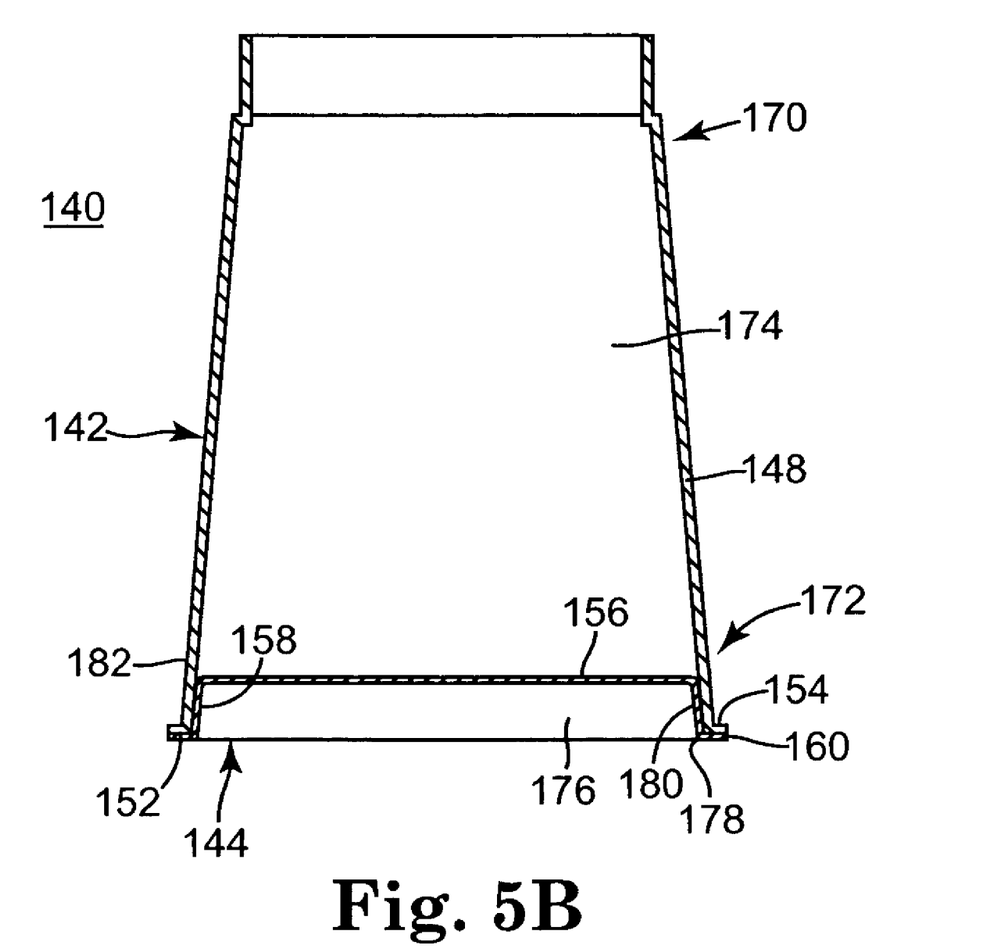
FIG. 5B is a cross-sectional view of the container of FIG. 5A.

The above-described transport device 80 construction is useful for handling and transporting a wide variety of differently configured containers. To this end, an exemplary container 140 is shown in FIGS. 5A and 5B. This one exemplary container 140 includes a sleeve member or upper main body portion 142, a lower bottom closure member 144, and a lid member or seal portion 146. The main body portion 142 has a sidewall 148 that is generally reversed frustoconical in shape so that it tapers from a smaller diameter open top 150 to larger diameter open bottom 152. An annular rim 154 of the main body portion 142 projects radially outwardly from the sidewall 148. The closure member 144 includes a transverse panel wall 156 and a reversed frustoconical shaped sidewall 158 that depends downwardly from a periphery of the transverse panel wall 156. A bottom peripheral edge of the sidewall 158 is formed with an annular rim 160. Similar to the annular rim 154 of the body portion 142, the annular rim 160 of the closure member 144 projects radially outwardly from the sidewall 158. In one preferred embodiment, the body portion 142 and the closure member 144 of the container 140 can be separately formed from a thermoplastic material using an injection molding process. Finally, the lid member 146 can assume a wide variety of forms and is configured for attachment to the main body portion 142 at the open top 150 thereof, for example following a filling operation.

Once again, the present invention is useful with a number of other container configurations that may or may not be entirely different from the container 140 described above. Regardless, and with specific reference to FIG. 5B, manufacture of the container 140 entails first securing the bottom closure member 144 to the main body portion 142 at the open bottom 152 of the main body portion 142. For example, the annular rims 154, 160 can be ultrasonically welded to one another. Regardless, and in more general terms, the resultant assembly provides the container 140 with opposing first and second end sections 170, 172 along with an internal storage region 174. Prior to application of the lid member 146 (FIG. 5A), the first end section 170 is open to the internal storage region 174, whereas the second end section 172 is closed relative to the internal storage region 174, such as by the transverse panel wall 156. Regardless of the number of components employed to form the second end section 172 (e.g., the main body portion 142 can be constructed to integrally form the transverse panel wall 156 such that the closure member 144 can be eliminated; component(s) in addition to the main body portion 142 and/or the closure member 144 are used to form the second end section 172; etc.), an internal, longitudinal recess 176 is defined, extending from an open, trailing end 178 of the second end section 172 to the transverse panel wall 156 (or other transverse stop surface). More particularly, an inner surface 180 of a sidewall of the second end section 172 (such as the sidewall 158 of the closure member 144) defines the longitudinal recess 176 that is otherwise open at the trailing end 178. Further, the second end section 172 defines an exterior surface 182 opposite the inner surface 180 (for example, an exterior surface of the sidewall 148 of the main body portion 142). With the one embodiment of FIG. 5B, the longitudinal recess 176 and in particular the inner surface 180, forms a reversed frustoconical shape in extension from the trailing end 178, although a wide variety of other shapes are equally acceptable.

Figure 6:
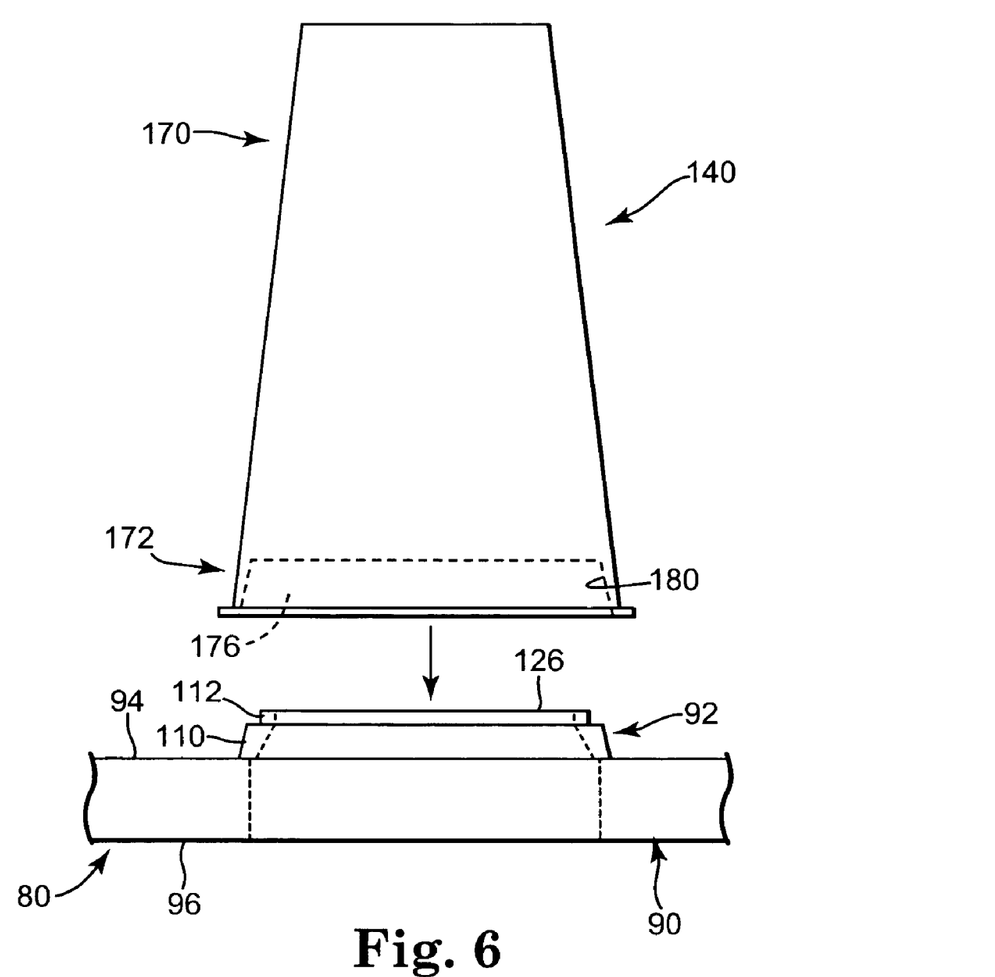
FIG. 6 is an exploded view of the container of FIG. 5A being assembled to the transport device of FIG. 3.
Figure 7:
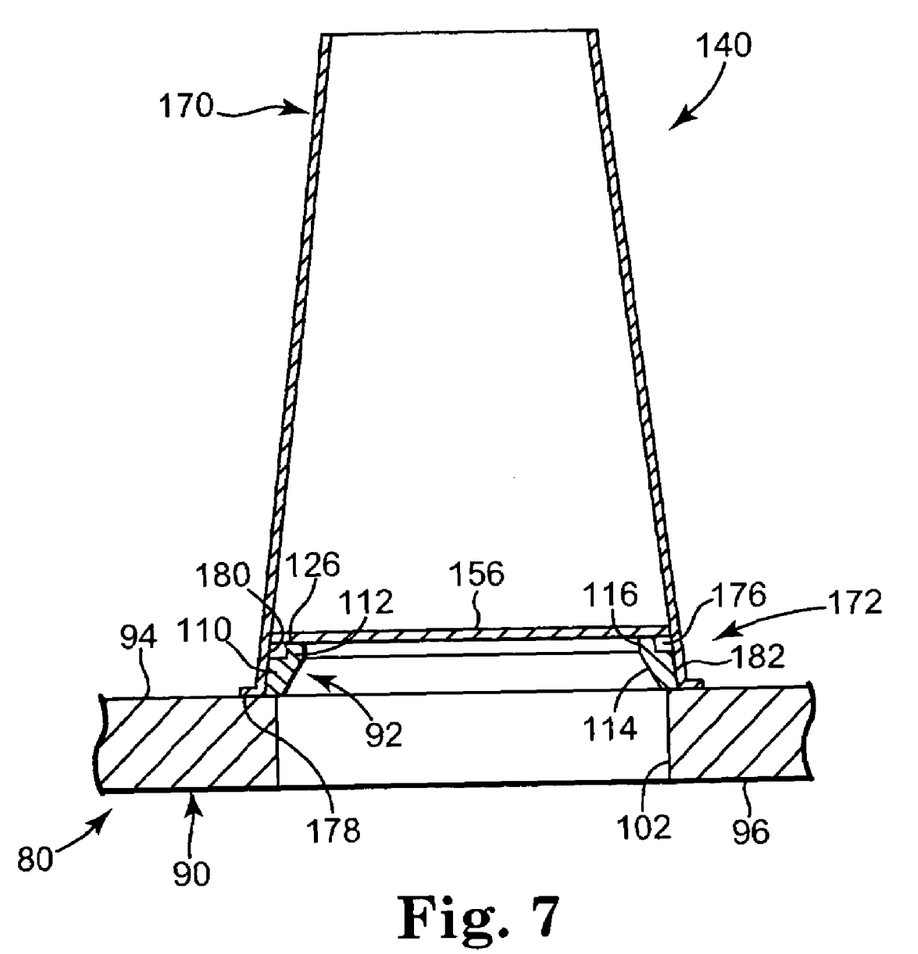
FIG. 7 is a cross-sectional view of the transport device and container of FIG. 6 upon final assembly.

With the above description in mind, FIGS. 6 and 7 illustrate mounting of the exemplary container 140 to the transport device 80 in accordance with the present invention. With initial reference to FIG. 6, the container 140 is positioned above a respective one of the mounting pieces 92 (one of which is shown in FIG. 6) otherwise assembled to the carrier plate 90 as previously described. In particular, the container 140 (that may or may not include the lid member 146 (FIG. 5A)) is oriented in an upright fashion such that the second end section 172 is adjacent the mounting piece 92 and the first end section 170 extends in an opposite direction. The container 140 is then lowered onto the mounting piece 92 such that the mounting piece 92 is received within the longitudinal recess 176. With additional reference to FIG. 7, the base 110 of the mounting piece 92 contacts and frictionally engages the inner surface 180 of the second end section 172. In one embodiment where a shape of the base 110 matches a shape of the inner surface 180, intimate contact between the base 110 and the inner surface 180 is achieved along an entirety of a longitudinal height of the base 110. Alternatively, intimate contact need not be achieved along an entirety of the base 110. Preferably, however, the base 110 contacts and rigidly engages the inner surface 180 at the trailing end 178 of the container 140 as well as at a point longitudinally spaced from the trailing end 178. In another embodiment, intimate contact between the base 110 and the inner surface 180 is achieved at a point at least 0.1 inch from the upper surface 94 of the carrier plate 90 along which the trailing end 178 of the container 140 otherwise rests. With this assembly, then, the container 140 is rigidly secured to the carrier plate 90 via the mounting piece 92, with an interface between the mounting piece 92 and the container 140 impeding, preferably preventing, lateral movement of the container 140 relative to the carrier plate 90.

As shown in FIG. 7, extension of the shoulder 112 from the base 110 is preferably sized in accordance with a height of the longitudinal recess 176 such that the leading end 126 of the shoulder 112 contacts the transverse panel wall 156 of the container 140, thereby providing further support. Alternatively, the mounting piece 92 can be configured such that the shoulder 112 does not contact the transverse stop surface 156 of the container 140; in fact, the shoulder 112 can be eliminated entirely. Preferably, however, the shoulder 112 facilitates placement of the container 140 onto the mounting piece 92, such as by guiding the second end section 172 onto the base 110 as previously described. Notably, securement of the container 140 to the transport device 80 is achieved without the inclusion of posts or other components that would otherwise interface with the exterior surface 182 of the second end section 172. Finally, by providing the mounting piece 92 with the passages 114, 116 (and 132 (FIG. 4C)) where the foot 130 (FIG. 4C) is provided as part of the mounting piece) and the carrier plate 90 with the aperture 102, air that might otherwise be entrapped as the container 140 is forced onto the mounting piece 92 readily escapes the transport device 80 such that a possible impediment to complete mounting of the container 140 is avoided.

Returning to FIG. 2, and with additional reference to FIGS. 6 and 7, general operation of the packaging system 70 includes operating the first station 74A to place one or more of the containers 72 (or the container 140) onto respective ones of the mounting pieces 92 otherwise provided by the transport devices 80. As a point of reference, with the one embodiment of FIG. 2, the so-loaded containers 72, 140 do not include a cover (such as the lid member 146 of FIG. 5A) such that the containers 72, 140 are "open" following operation of the first station 74A.

The drive system 76 then maneuvers the transport device 80 (otherwise loaded with one or more of the containers 72, 140) from the first station 74A to the second station 74B. During movement of the transport device 80, the mounting piece 92 essentially prevents the container 72 or 140 from tipping or otherwise disengaging from the transport device 90. That is to say, upon assembly of the container 72, 140 to the mounting piece 90, a contact interface is established between the inner surface 180 and the base 110. This contact interface (e.g., surface area) remains substantially constant, more preferably does not change, with movement of the carrier plate 90.

The second station 74B is then operated to fill the container(s) 72, 140 with a desired product. As used throughout the specification, the terms "fill" or "filling" are in reference to dispensing a flowable product into the container 72, 140. The amount or volume of the product dispensed within the container 72, 140 can vary from application-to-application, such that following operation of the second station 74B, the container 72, 140 may be partially or completely filled.

Regardless, following processing by the second station 74B, the drive system 76 is again operated to maneuver the transport device 80, that otherwise maintains the now completely filled or partially filled container(s) 72, from the second station 74B to the third station 74C. The third station 74C is then operated to apply a cover (such as the lid member 146 of FIG. 5A) to the container(s) 72, 140. Once again, the rigid engagement achieved between the mounting piece 92 and the container 72, 140 impedes or prevents the container 72, 140 from tipping relative to the carrier plate 90 or otherwise disengaging the transport device 80. Following operation of the third station 74C, the completed, filled containers 72 are ready for subsequent processing/distribution.

The above-describe method can be employed with a wide variety of containers and a wide variety of flowable products. For example, the flowable product otherwise dispensed to the containers 72, 140 can be yogurt and the containers 72, 140 sized to receive 6 ounces (170 grams) of yogurt. However, it will be understood that the size and dimensions of the containers 72, 140 can be varied from that described herein, as can the flowable product, and still fall within the scope of the present invention. Thus, the flowable product can be liquid or solid (e.g., in particulate form) and can be something other than a food product.

Figure 8A:
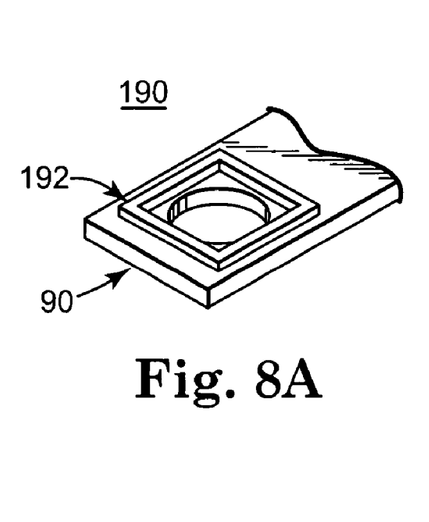
FIG. 8A is a perspective view of a portion of an alternative embodiment transport device in accordance with the present invention.
Figure 8B:
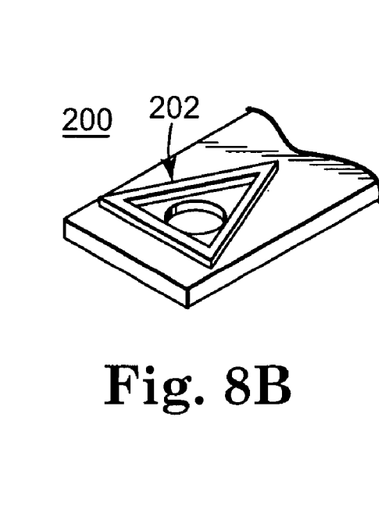
FIG. 8B is a perspective view of a portion of another alternative embodiment transport device in accordance with the present invention.
Figure 8C:
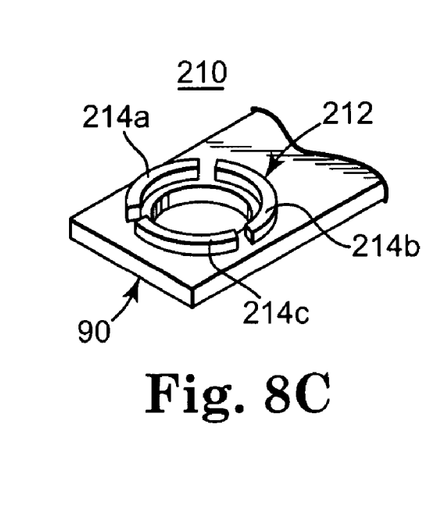
FIG. 8C is a perspective view of a portion of another alternative embodiment transport device in accordance with the present invention.

While the mounting piece 92 of the present invention has been described as being circular in transverse cross-section, a wide variety of other constructions are also within the scope of the present invention. For example, FIG. 8A illustrates an alternative embodiment transport device 190 including the carrier plate 90 and one or more mounting pieces 192. The mounting piece 192 defines a square in transverse cross-section, and is characterized by a non-tapering wall and the absence of a shoulder. Yet another alternative embodiment transport device 200 is shown in FIG. 8B that includes a mounting piece 202 defining a triangle in transverse cross-section. Once again, a wide variety of other shapes can also be employed. FIG. 8C illustrates yet another alternative embodiment transport device 210 including the carrier plate 90 and a mounting piece 212. The mounting piece 212 includes three discontinuous sections 214a–214c that combine to define a circular perimeter in transverse cross-section. While FIG. 8C illustrates three of the sections 214a–214c, any other number is equally acceptable, as is a shape of the transverse, cross-section perimeter. Regardless, and with this one construction, contact between the mounting piece 212 and the container 72, 140 (FIGS. 2 and 5A) occurs at less than an entirety of a transverse perimeter of the inner surface 180 (FIG. 5B) upon final assembly. Preferably, however, contact is achieved at at least three points along the transverse, inner surface 180 perimeter.

The system and method of the present invention provide a marked improvement over previous packaging system designs. By engaging an inner surface of the individual containers, the transport device of the present invention consistently and rigidly secures each container, virtually eliminating the opportunity for highly undesirable container tipping.

Although the present invention has been described with reference to preferred embodiments, workers skilled in the art will recognize that changes can be made in form and detail without departing from the spirit and scope of the present invention.

What is claimed is:

1. A method of transporting containers from a first station to a second station within a container filling system, each container defining opposed first and second end sections, the second end section forming a longitudinal recess defined by an inner surface of a sidewall, the method comprising:
    providing a carrier plate having at least one mounting piece, the mounting piece including:
        a base extending from an upper surface of the carrier plate and defining a maximum outer, transverse dimension of the mounting piece, the base adapted to receive a second end section of a container, and
        a shoulder extending from the base opposite the carrier plate, the shoulder having a maximum outer, transverse dimension less than the maximum outer transverse dimension of the base,
        wherein the base and the shoulder are rings having co-axial central passages;
    loading a container onto the mounting piece such that the second end section is positioned over the mounting piece and the mounting piece frictionally engages the inner surface of the longitudinal recess; and
    moving the carrier plate from the first station to the second station, wherein the mounting piece secures the container relative to movement of the carrier plate.

2. The method of claim 1, wherein loading the container includes:
    aligning the second end section above the mounting piece; and
    directing the container toward the mounting piece such that the second end section engages the mounting piece.

3. The method of claim 1, wherein loading the container includes orienting the container such that the first end section is opposite the carrier plate.

4. The method of claim 1, wherein loading the container includes positioning the container in an upright fashion relative to the carrier plate.

5. The method of claim 1, wherein the second end section of the container terminates in a trailing end, and further wherein loading the container includes contacting the trailing end against the carrier plate.

6. The method of claim 1, wherein the inner surface of the longitudinal recess defines a perimeter in transverse cross-section, and further wherein loading the container includes achieving engagement between the mounting piece and at least three points along the perimeter.

7. The method of claim 6, wherein loading the container includes achieving engagement between the mounting piece and an entirety of the perimeter.

8. The method of claim 1, wherein the inner surface of the longitudinal recess defines a shape in transverse cross-section, and further wherein loading the container includes matching the shape of the longitudinal recess with a shape of the mounting piece.

9. The method of claim 8, wherein the shape is circular.

10. The method of claim 8, wherein the shape is selected from the group consisting of triangular, square, and rectangular.

11. The method of claim 1, wherein the mounting piece extends beyond a plane defined by the carrier plate, and further wherein the longitudinal recess extends from an open end to an internal stop surface positioned between the open end and the first end section, and further wherein loading the container includes contacting the internal stop surface with the mounting piece at a location longitudinally spaced from the open end.

12. The method of claim 11, wherein an extension of the mounting piece from the carrier plate approximates a height of the longitudinal recess.

13. The method of claim 11, wherein loading the container includes contacting the inner surface with the mounting piece at at least two longitudinally spaced locations.

14. The method of claim 13, wherein extension of the inner surface from the open end to the internal stop surface defines a reversed frustoconical shape, and further wherein the mounting piece includes a base and a shoulder, wherein loading of the container includes engaging the inner surface with the base.

15. The method of claim 1, wherein the mounting piece includes a base and a shoulder, the shoulder extending from the base opposite the carrier plate, and further wherein loading the container includes guiding the second section onto the base via the shoulder.

16. The method of claim 1, wherein moving the carrier plate is characterized by the mounting piece preventing the container from tipping relative to the carrier plate.

17. The method of claim 1, wherein loading the container includes establishing a contact interface between the mounting piece and the inner surface, and further wherein moving the carrier plate is characterized by an absence of change in the contact interface.

18. The method of claim 1, wherein loading the container is characterized by the absence of contact between an exterior surface of the sidewall and a component extending from the carrier plate.

19. The method of claim 1, wherein the carrier plate includes a multiplicity of mounting pieces, the method further comprising:
loading a multiplicity of containers onto the multiplicity of mounting pieces, respectively.

20. The method of claim 1, wherein the first station is a container loading station and the second station is a filling station.

21. The method of claim 20, further comprising:
at least partially filling the container with a product at the filling station.

22. The method of claim 21, wherein the product is a flowable product.

23. The method of claim 21, wherein the product is yogurt.

24. The method of claim 21, further comprising:
moving the carrier plate from the filling station to a closing station, wherein the mounting piece secures the at least partially filled container relative to the carrier plate during movement from the filling station to the closing station.

25. The method of claim 24, further comprising:
applying a cover to the first end section of the container at the closing station.

26. The method of claim 1, wherein the carrier plate forms an aperture, the mounting piece being assembled to the carrier plate such that the central passages are co-axially aligned with the aperture.

27. A container filling system for filling containers, each container defining opposing first and second end sections, the second end section forming a longitudinal recess defined by an interior surface of a sidewall, the system comprising:
a first, container loading station;
a second, container filling station; and
a drive system for transporting containers from the first station to the second station, the
drive system having a transport device including:
a carrier plate connected to a drive mechanism, the carrier plate defining an upper surface and a lower surface,
at least one mounting piece assembled to the carrier plate and extending from the upper surface, the mounting piece adapted to engage the interior surface of the longitudinal recess of a respective one of the containers and secure the container relative to movement of the carrier plate, the mounting piece including:
a base extending from the upper surface of the carrier plate and defining a maximum outer, transverse dimension of the mounting piece, the base adapted to receive a second end section of a container, and
a shoulder extending from the base opposite the carrier plate, the shoulder having a maximum outer, transverse dimension less that the maximum outer, transverse dimension of the base,
wherein the base and the shoulder are rings having co-axial central passages, and further wherein the transport device is characterized by the absence of posts extending from the upper surface of the carrier plate adjacent the mounting piece.

28. The system of claim 27, wherein a perimeter shape of the base matches a transverse cross-sectional shape of the longitudinal recess.

29. The system of claim 27, wherein the base defines a circular shape in transverse cross-section.

30. The system of claim 27, wherein the base defines a shape in transverse cross-section selected from the group consisting of a square, triangle, and rectangle.

31. The system of claim 27, wherein the longitudinal recess extends from an open, trailing end to an internal stop surface, and further wherein the base has a height less than a longitudinal distance between the trailing end and the internal stop surface.

32. The system of claim 27, wherein the base has a height in the range of 0.1–0.4 inch.

33. The system of claim 27, wherein the base and the shoulder are each circular in transverse cross-section.

34. The system of claim 27, wherein the shoulder and the base combine to define a height in the range of 0.3–0.6 inch.

35. The system of claim 27, wherein the carrier plate forms an aperture, the mounting piece being assembled to the carrier plate such that the central passages are co-axially aligned with the aperture.

36. The system of claim 27, wherein the transport device includes a multiplicity of mounting pieces assembled to the carrier plate.

37. The system of claim 27, wherein the drive system includes a multiplicity of carrier plates each having a multiplicity of mounting pieces assembled thereto.

38. The system of claim 27, wherein the container defines an internal region, the first end section being open to the internal region and the second end section being closed to the internal region, and further wherein the transport device is adapted to receive the container in an upright position at the first station.

39. The system of claim 27, wherein the filling station is adapted to dispense a flowable product into the container.

40. The system of claim 39, wherein the flowable product is yogurt.

41. The system of claim 27, further comprising:
   a third, covering station adapted to apply a cover to the first end section of the container after processing by the second station;
   wherein the drive system is adapted to transport the container from the second station to the third station.

42. A transport device for use with a container packaging system in packaging one or more containers each defining opposing first and second end sections, the second end section forming a longitudinal recess defined by an interior surface of a sidewall, the transport device comprising:
   a carrier plate defining a top surface and a bottom surface; and
   at least one mounting piece assembled to the carrier plate and extending from the top surface, the mounting piece adapted to engage the interior surface of the longitudinal recess of a respective one of the containers and secure the container relative to movement of the carrier plate, the mounting piece including:
      a base extending from the top surface of the carrier plate and defining a maximum outer, transverse dimension of the mounting piece, the base adapted to receive a second end section of a container, and
      a shoulder extending from the base opposite the carrier plate, the shoulder having a maximum outer, transverse dimension less than the maximum outer, transverse dimension of the base;
   wherein the base and the shoulder are rings having co-axial central passages, and further wherein the transport device is characterized by the absence of posts extending from the top surface of the carrier plate adjacent the mounting piece.

43. The transport device of claim 42, wherein the maximum outer transverse dimension of the base approximates a transverse dimension of the longitudinal recess.

44. The transport device of claim 43, wherein the base defines a continuous perimeter.

45. The transport device of claim 43, wherein the base defines a discontinuous perimeter.

46. The transport device of claim 43, wherein the base includes an exterior surface defining a reversed frustoconical shape.

47. The transport device of claim 43, wherein the base forms a circle in transverse cross-section.

48. The transport device of claim 42, wherein the carrier plate forms an aperture, the mounting piece being assembled to the carrier plate such that the central passages are co-axially aligned with the aperture.

* * * * *